Figure 3:
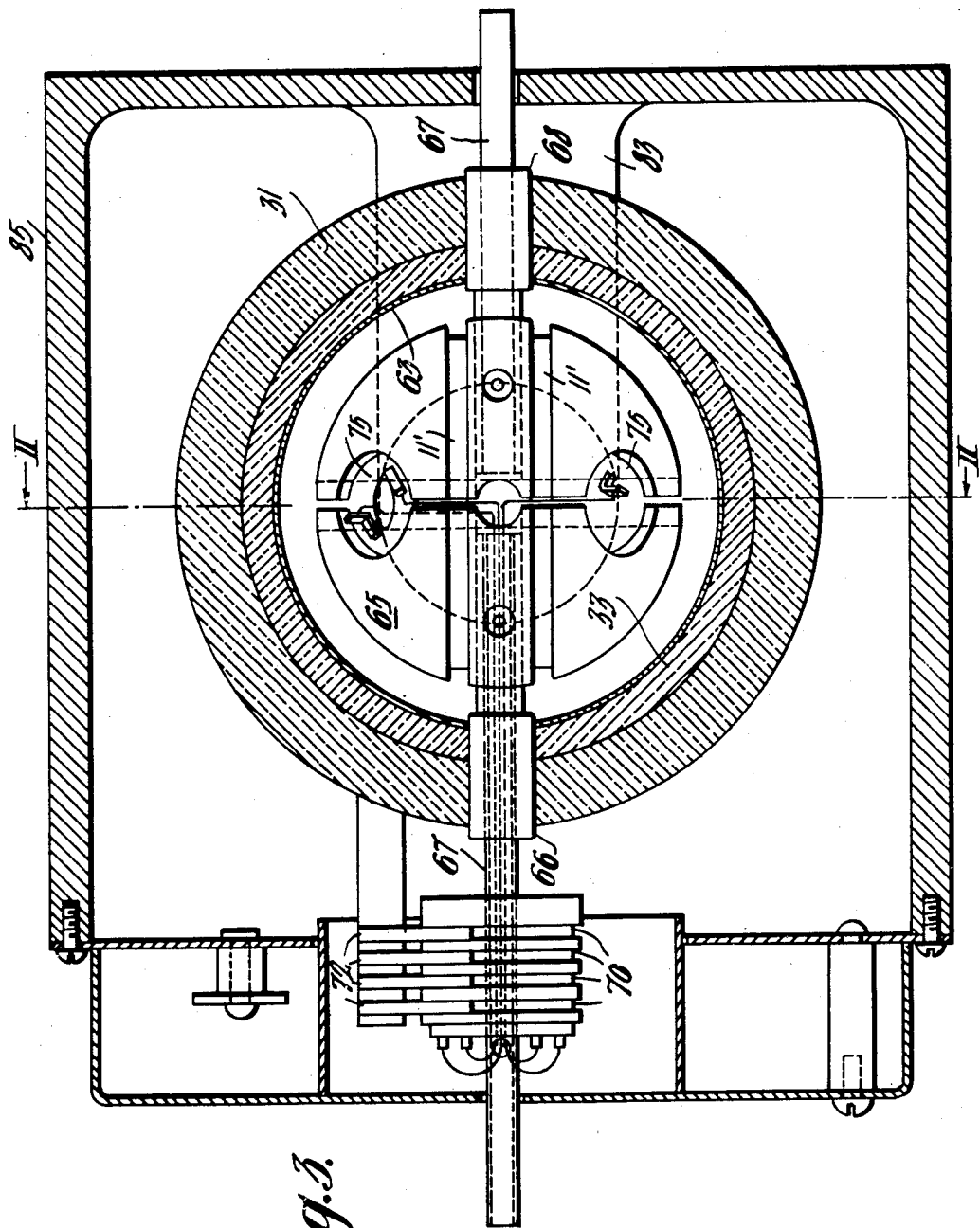

Dec. 7, 1948.  M. L. GREENOUGH  2,455,672
CORRECTION DEVICE FOR ELECTRONIC FUNCTION GENERATORS
Filed Sept. 28, 1945  2 Sheets-Sheet 1
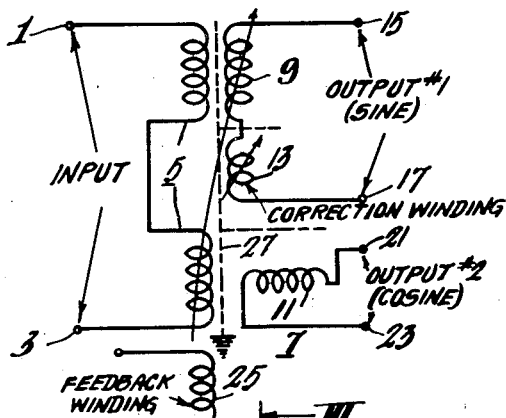
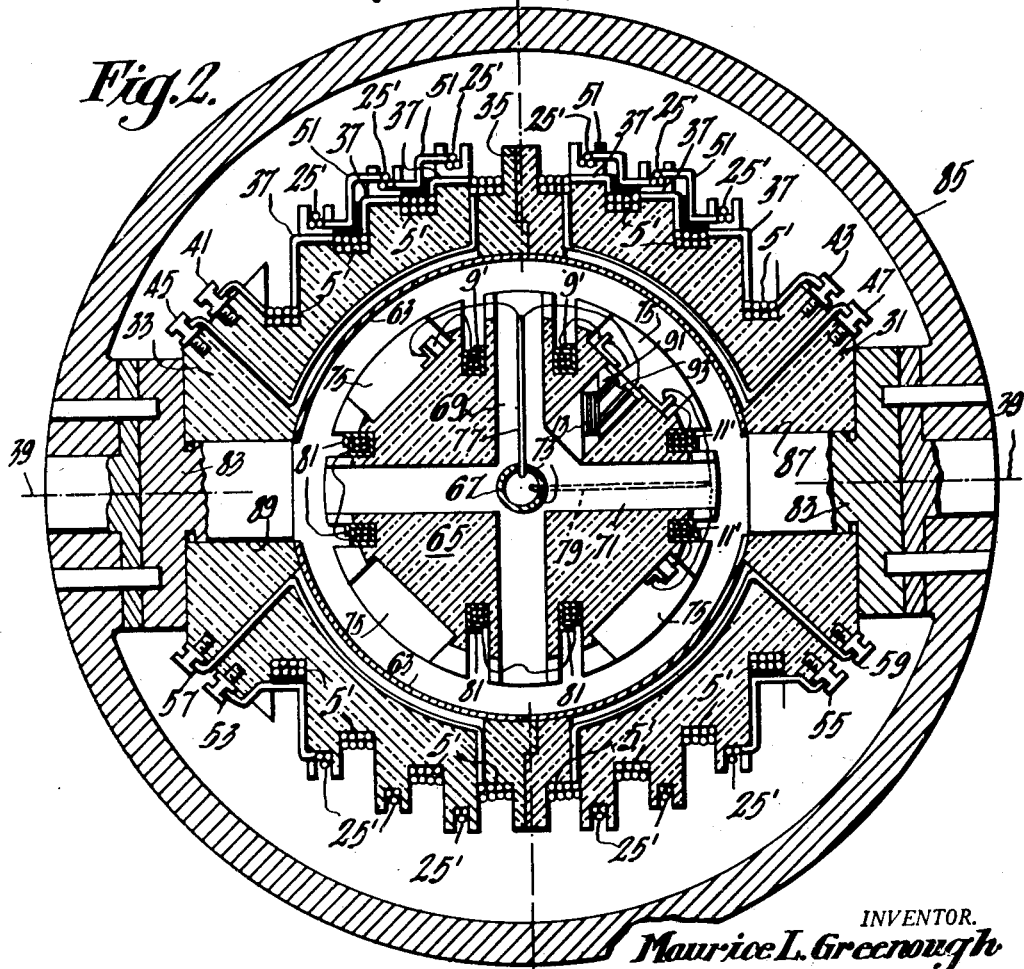
INVENTOR.
*Maurice L. Greenough*
BY
ATTORNEY Dec. 7, 1948. M. L. GREENOUGH 2,455,672
CORRECTION DEVICE FOR ELECTRONIC FUNCTION GENERATORS
Filed Sept. 28, 1945 2 Sheets-Sheet 2

INVENTOR.
Maurice L. Greenough
BY
ATTORNEY

Patented Dec. 7, 1948

2,455,672

UNITED STATES PATENT OFFICE 2,455,672

CORRECTION DEVICE FOR ELECTRONIC FUNCTION GENERATORS

Maurice Leighton Greenough, Groveland, Mass., assignor to Radio Corporation of America, a corporation of Delaware Application September 28, 1945, Serial No. 619,237

9 Claims. (Cl. 171—119)

1

This invention relates generally to electronic function generators and more particularly to an improved electromagnetic variocoupler having a stator winding and a pair of substantially perpendicularly-disposed rotor windings simultaneously rotatable in the stator field and including a correction device comprising a third rotor winding rotatable with said pair of windings and serially-connected with one of said pair of windings for compensating for lack of perpendicularity between said pair of windings.

In electronic computing systems for solving ballistic functions in the process of sighting a gun at a remote fixed or movable target, it is customary to derive the present slant range data by means of optical or radar sighting apparatus. The slant range data thus obtained are in polar coordinates which often must be converted into the rectangular or Cartesian coordinates representing present elevation and present ground range. In the case where the slant range tracking data is derived by radar apparatus, the slant range may be represented by an alternating voltage having a magnitude corresponding to the value of the slant range.

The instant invention comprises a novel variocoupler and correction devices therefor wherein the alternating voltage having a magnitude corresponding to the value of the slant range is applied to a stator winding to establish a magnetic field having an intensity corresponding to the value of the slant range. A pair of mutually perpendicular rotor coils rotatable within the magnetic field provide output voltages having magnitudes corresponding substantially to the sine and cosine, respectively, of the field energizing voltages. The rotor output voltage having a magnitude corresponding to the product of the sine of the angular rotation of the rotor and the magnitude of the stator energizing voltage is proportional to the value of the present elevation. Likewise, the rotor output voltage corresponding to the product of the cosine of the angular rotation and the magnitude of the stator energizing voltage is proportional to the value of the present ground range.

Since ballistic functions must be solved with an extremely high degree of accuracy, it is essential that the derived sine and cosine function currents be extremely close approximations of the true sine and cosine function values. Since mechanical and electrical limitations in the variocoupler inherently limit the accuracy with which such devices may be constructed, it is essential that auxiliary means must be included

2 for correcting for lack of perpendicularity between the normally-disposed rotor windings in order that null current values may be obtained from the rotor windings with precisely 180° angular separation. Without such correction the null points may deviate from the 180° angular separation by several mils of angle even when great care is taken in construction and assembly of the variocoupler.

The invention contemplates the use of a variocoupler of the type described wherein the stator windings are designed to produce a substantially uniformly distributed magnetic field. The stator support comprises a pair of hemispherical insulating members each having a plurality of separate series-connected winding sections supported in slots on the external surface of the sphere, the density of the stator windings being substantially constant along the axis of the coil. The rotor windings are each wound in pairs of peripheral slots which are mutually perpendicular. In order to insure that the stator field may be accurately proportional in magnitude to the value of the energizing voltage, a plurality of feedback windings are wound in other peripheral slots on the stator support intermediate the several stator winding sections.

The method and means of employing the currents from the feedback windings to compensate for variations in the gain of the driving circuit and for the effects of resistance in the variocoupler windings is disclosed and claimed in the copending application of Arthur W. Vance, Serial No. 607,887, filed July 30, 1945, assigned to the same assignee as the instant application. In the device described in said copending application the stator is energized by signals derived from an input amplifier or other circuit, not shown, which is responsive to the present slant range alternating signal voltage. The feedback winding is connected through a variable phase control and a variable amplitude control to the input circuit of the amplifier in a manner whereby the amplifier input voltage and the feedback voltage are in phase opposition, and wherein the amplitude of the feedback voltage is but slightly less than the amplitude of the input voltage. Thus the flux density generated by the stator winding is substantially determined by the magnitude of the input voltage to the amplifier, and is almost independent of amplifier gain and the resistance of the field windings. The system thus described may be termed a "constant flux" feedback system wherein the output voltages derived from the rotor windings are substantially trigonometric functions of the input voltage magnitudes, provided that the field and the rotor windings are properly oriented with respect to each other and to the respective winding axes, and further providing that the shape of the field is not distorted by adjacent shields or other structure.

Since stator field distortion is inherent in all such devices, it is essential that correcting means be provided for separating null current values in each of the rotor winding output circuits by angular values of exactly 180°. Applicant's copending U. S. application Serial No. 619,239 filed September 28, 1945, discloses and claims the use of separate, angularly-adjustable, small correction coils which are serially-connected with the rotor windings and adjustably coupled to the stator field for compensating for distortion of the stator field. For the sake of simplifying the drawings, this feature is not illustrated or described in detail herein.

The instant invention contemplates the use of an additional small correction winding which is simultaneously rotatable with the normally-disposed rotor windings and serially-connected with one of said rotor windings. The inductive coupling of the correction winding to the stator field and to one or both of the rotor windings is made adjustable in order that correction may be made during preliminary adjustment of the device for lack of perpendicularity between said rotor windings in order that null output currents may be obtained therefrom with exactly 90° angular separation as the rotor is revolved.

One of the objects of the invention is to provide an improved method of and means for electronically deriving non-linear functions of a variable quantity. Another object of the invention is to provide an improved electronic function generator for deriving currents having magnitudes which are non-linear functions of the magnitude of an applied current. A further object of the invention is to provide an improved electronic tracking device and correction device for converting the values of a variable quantity in polar coordinates to corresponding values of said variable in Cartesian coordinates. An additional object of the invention is to provide an improved variocoupler and winding orientation correction device for converting an energizing alternating potential to other potentials corresponding in magnitude to the sine and cosine of the magnitude of the energizing potential with respect to the angular displacement of the rotating element of the variocoupler.

Another object is to provide a variocoupler having a correction winding for compensating for inherent misalignment of a pair of nominally perpendicularly-disposed rotor windings. An additional object is to provide an improved variocoupler and energizing circuit therefor which includes a feedback network for compensating for variations in gain and resistance in the energizing circuit, and which includes at least one correction winding for compensating for inherent misalignment of a pair of nominally perpendicularly disposed windings.

A further object is to provide an improved variocoupler including stator, rotor and correction windings wherein the rotor and correction windings are serially-connected, and the correction windings are adjustably coupled to the stator fields and rotor winding to compensate for misalignment of nominally normally-disposed rotor windings.

The invention will be described in greater detail by reference to the accompanying drawing of which Figure 1 is a schematic circuit diagram of a preferred embodiment thereof, Figure 2 is an elevational cross-sectional view taken along the section line II—II and Figure 3 is a side elevational view of a preferred embodiment of a variocoupler including a pair of adjustable correction windings as schematically shown in Figure 1. Similar reference characters are applied to similar elements throughout the drawing.

Referring to the circuit of Figure 1, input signals having a frequency, for example, of 2500 C. P. S., are applied to the input terminals 1, 3 which are connected to the stator winding 5 of a variocoupler 7 of the type generally described heretofore. The variocoupler 7 includes a pair of mutually perpendicular rotor windings 9, 11, which are continuously and simultaneously rotatable within the uniformly distributed magnetic field produced by energization of the stator windings. The first rotor winding 9 is coupled through an adjustably orientable correction winding 13 to output terminals 15, 17, which provide currents proportional in magnitude to the sine of the magnitudes of the input current, likewise the second rotor winding 11 is connected to other output terminals 21, 23, for deriving currents of magnitude proportional to the cosine of the magnitude of the input signal currents.

A feedback winding 25 fixedly supported with respect to the stator winding 5 generates a feedback current which is utilized, as described in said copending Vance application, for inserting in series with the input voltage a voltage in phase opposition to, and but of slightly lower magnitude than, said input voltage. The magnitude of the energizing field generated by the stator winding 5 thus is substantially determined by the magnitude of said input voltage applied to the input terminals 1 and 3, and is substantially independent of variations in the gain of the input circuit and of the resistance of the field and feedback variocoupler windings 5 and 25. It should be understood that the strength of the feedback voltage may be controlled by the number of turns on the feedback windings and that the energizing field intensity and stability may be controlled by adjustment of the phase and amplitude of the feedback current.

Since it is desirable that the output currents derived from the output terminals 15, 17 and 21, 23 shall be true trigonometric functions of the magnitudes of the currents energizing the stator winding 5, it is essential that capacitive coupling between the various windings of the variocoupler be substantially eliminated since such capacitive coupling would provide fictitious output currents from the rotor windings and would also permit undesirable reaction between the output circuits. To overcome such capacitive coupling between the several windings of the variocoupler, electrostatic shields indicated by the dash line 27 are interposed between the various windings and are effectively grounded.

Referring to Figures 2 and 3, a preferred embodiment of an accurately aligned variocoupler including the novel features of the invention includes a pair of substantially hemispherical stator insulating supports 31 and 33 which may be telescoped together at the joint 35. The external surface of the stator sections include peripheral slots for supporting a plurality of sections 5' of the stator winding 5. The stator sections 5' are wound with insulating conductors and are serially-connected by means of jumpers 37 between adjacent winding sections. The numbers of turns on each coil section, and the spacing between adjacent coil sections, are arranged to provide a constant winding density along the axis 39 of the coil to produce an electromagnetic field having substantially uniform intensity. The serially-connected stator winding sections 5' are terminated in a pair of input terminals 41, 43. The ends of the serially-connected stator windings 5' on each of the hemispherical stator supports 31, 33 are terminated in additional terminals 45, 47 which may be connected together by means of a jumper lead, not shown, after the variocoupler is assembled.

The feedback winding 25 comprises a plurality of small winding sections 25' which are similarly connected together by jumpers 51 on each of the stator supports. The feedback winding sections 25' each comprise relatively few turns supported in other peripheral slots disposed intermediate the stator winding sections 5'. The output terminals 53, 55 of the feedback winding provide for connection to the feedback circuit, and the two halves of the feedback winding are terminated in terminals 57 and 59 which are connected together by means of a jumper lead, not shown, after the variocoupler is assembled. The internal surfaces of the stator supports 31 and 33 are covered by means of a conducting shield 63 which may be grounded in any well known manner. The conductive electrostatic shield 63 may comprise, for example a coating of carbonaceous material such as "Aquadag."

The rotor windings are supported on a substantially spherical insulating support 65 which is rotatable with a rotor shaft 67 journalled in suitable bearings 66 and 68 mounted on the stator support. The rotor shaft 67 preferably is hollow in order that the rotor winding terminal leads may be conveniently brought out to conventional slip rings 70 and contacts 72, or other rotor terminals. The rotor support 65 includes a pair of perpendicularly disposed radial channels 69, 71 for the output terminal leads from the rotor windings. The hollow rotor shaft 67 includes suitable apertures 73 in the periphery thereof for permitting the rotor winding and correction winding leads to be brought through the hollow shaft.

The rotor windings 9' and 11' are wound in mutually perpendicular pairs of peripheral slots in the rotor support 65, and terminated in suitable terminals set into shallow depressions 75 in the rotor support. The rotor winding terminals and correction winding are connected by means of pairs of flexible insulating leads 77 and 79 which pass through the channels 69 and 71 and through the center of the hollow rotor shaft 67, to the external terminating means. The individual rotor coil sections 9' and 11' include individual electrostatic shields 81 which may comprise, for example, a thin layer of metallic foil surrounding each of the winding sections. The several rotor coil shields may be connected together and grounded to the rotor shaft in any conventional manner.

The stator and feedback windings and the rotor support including the slots for the perpendicularly disposed rotor windings should be as accurately aligned as possible. The rotor shaft 67 also should be accurately aligned with one of the center axes of the stator in order that output currents derived from the rotor windings may substantially approximate true trigonometric functions of the energizing current applied to the stator winding.

The stator supports 31, 33 preferably should telescope closely and should be cemented or otherwise held together after assembling. The stator sphere may be supported by projecting pins or brackets 83 fastened to the outer supporting shield 85 and journalled into the openings 87, 89 on the stator axis 39.

The correction winding 13 comprises a relatively few turns of insulated conductors wound upon a cylindrical insulating spool 91 at an angle of 45° to the axis of said spool. The spool 91 is loosely fitted into a complementary channel in the rotor support 65, said channel being at an angle of 45° to the other channels 69, and 71, described heretofore. The correction winding spool 91 includes a slot 93 at one end thereof for rotating the spool within the channel in the rotor support for orienting the correction winding 13 with respect to the other rotor windings 9 and 11. The correction winding 13 is serially-connected with the first rotor winding 9.

Rotation of the winding spool 91 by means of any suitable tool inserted into the slot 93 rotates the correction winding 13 to provide the desired coupling to the second rotor winding 11 and to the stator field. Due to the 45° angle of the correction winding on the winding spool 91, the correction winding may be adjusted to any desired orientation in the rotor support, and thus may be coupled to one or both of the rotor windings and to the stator field as desired. The correction winding 13 may be electrostatically shielded from the other windings of the variocoupler by means of a coating of Aquadag which may be grounded to the other electrostatic shields in any convenient manner.

Thus the invention disclosed comprises an accurately aligned variocoupler including a stator winding, a pair of substantially perpendicularly disposed rotor windings, a fixed feedback winding on the stator support for providing feedback currents of suitable phase and amplitude for compensating for variations in gain and resistance in the stator field energizing circuit, and a correction winding mounted on the rotor support, serially-connected with one of the rotor windings, and adjustably inductively coupled to one or both of said rotor windings and the stator field. Adjustment of the orientation of the correction winding in the rotor support may be made for compensating for lack of true perpendicularity between the nominally normally-disposed rotor windings, in order that null values of the output currents derived from such normally-disposed windings may occur at angular separations of precisely 90° as the rotor support is rotated.

I claim as my invention:

1. In a variocoupler having a stator winding and a pair of rotor windings fixedly disposed substantially at a right angle to each other and rotatable simultaneously with respect to said stator winding, means for compensating for lack of true perpendicularity between said rotor windings comprising a third rotor winding serially-connected with one of said pair of rotor windings and selectively inductively coupled to both of said pair of windings.

2. In a variocoupler having a stator winding and a pair of rotor windings fixedly disposed substantially at a right angle to each other and rotatable simultaneously with respect to said stator winding, means for compensating for lack of true perpendicularity between said rotor windings comprising a third rotor winding serially-connected with one of said pair of rotor windings and selectively inductively coupled to the other of said pair of windings.

3. Apparatus for deriving currents having instantaneous amplitudes equal to a non-linear function of the instantaneous amplitudes of applied currents including a variocoupler having a first winding responsive to said applied currents for establishing an alternating magnetic field and having a second winding coupled to said field and selectively rotatable through a predetermined angle with respect to said first winding for deriving a first output current substantially proportional to a sine function of said angle, a third winding fixedly disposed substantially at a right angle with respect to and rotatable with said second winding for deriving a second output current substantially proportional to a cosine function of said angle, and a compensating winding eccentrically disposed with and rotatable with and selectively inductively coupled to one of said second and third windings and serially-connected therewith for adjusting the null current separation of said output currents to substantially true quadrature relation.

4. Apparatus for deriving currents having instantaneous amplitudes equal to a non-linear function of the instantaneous amplitudes of applied currents including a first winding having connections for said applied currents for establishing a substantially uniform alternating magnetic field, a second winding selectively rotatable through a predetermined angle within said field for deriving first output currents having amplitudes proportional to the density of said field and to the sine of said angle, a third winding fixedly disposed substantially at a right angle with respect to and rotatable with said second winding and coupled to said field for deriving second output currents proportional in amplitude to said density of said field and to the cosine of said angle, and a compensating winding rotatable with and selectively inductively coupled to and serially-connected with one of said second and third windings for adjusting the null current separation of said output currents to substantially true quadrature relation.

5. Apparatus for deriving currents having instantaneous amplitudes equal to a non-linear function of the instantaneous amplitudes of applied currents including a variocoupler having a stator comprising a plurality of serially-connected parallel disposed lumped windings having connections for said applied currents for establishing a substantially uniform alternating magnetic field, a rotor having a plurality of first serially-connected parallel disposed lumped windings selectively rotatable through a predetermined angle within said field for deriving first output currents having amplitudes proportional to the density of said field and approximately proportional to the sine of said angle, a plurality of other serially-connected parallel disposed lumped rotor windings fixedly disposed substantially at a right angle with respect to and rotatable with said first rotor windings and coupled to said field for deriving second output currents proportional in amplitude to said density of said field and approximately proportional to the cosine of said angle, and a compensating winding rotatable with and selectively inductively coupled to and serially-connected with one of said rotor windings for adjusting the null current separation of said output currents to substantially true quadrature relation.

6. Apparatus according to claim 5 including electrostatic shielding means interposed between said stator and said rotor windings.

7. Apparatus according to claim 5 including electrostatic shielding means interposed, respectively, between said stator and said rotor windings, between said several rotor windings, and between said compensating winding and said rotor windings.

8. Apparatus for deriving currents having instantaneous amplitudes equal to a non-linear function of the instantaneous amplitudes of applied currents including a variocoupler having a stator comprising a plurality of serially-connected parallel disposed lumped multilayer windings having connections for said applied currents for establishing a substantially uniform alternating magnetic field, a rotor having a plurality of first serially-connected parallel disposed lumped multilayer windings selectively rotatable through a predetermined angle within said field for deriving first output currents having amplitudes proportional to the density of said field and approximately proportional to the sine of said angle, a plurality of other serially-connected parallel disposed lumped multilayer rotor windings fixedly disposed substantially at a right angle with respect to and rotatable with said first rotor windings and coupled to said field for deriving second output currents proportional in amplitude to said density of said field and approximately proportional to the cosine of said angle, and a compensating winding rotatable with and selectively inductively coupled to and serially-connected with one of said rotor windings for adjusting the null current separation of said output currents to substantially true quadrature relation, said compensating winding being supported in a bearing in said rotor and being selectively adjustable through a right angle formed by the axes of said rotor windings.

9. Apparatus according to claim 8 wherein said compensating winding is supported by an insulated cylindrical form journalled in said rotor bearing at an angle intermediate the axes of said rotor windings, and wherein the axis of said compensating winding forms the same angle with the axis of said form.

MAURICE LEIGHTON GREENOUGH.

REFERENCES CITED

The following references are of record in the file of this patent:

UNITED STATES PATENTS

| Number | Name | Date |
|---|---|---|
| 1,083,085 | Gowing et al. | Dec. 30, 1913 |
| 2,114,189 | Kronmiller | Apr. 12, 1938 |
| 2,156,055 | Holsten | Apr. 25, 1939 |
| 2,318,271 | Weiche | May 4, 1943 |
| 2,340,731 | Boyson | Feb. 1, 1944 |